May 15, 1962

T. H. MEAD 3,034,712

RECORD MEMBER

Filed April 1, 1957

2 Sheets-Sheet 1

INVENTOR.
THOMAS H. MEAD
BY Morris ... [signature]
ATTORNEY

INVENTOR.
THOMAS H. MEAD
BY
Morris A. Rabkin
ATTORNEY

United States Patent Office 3,034,712
Patented May 15, 1962

3,034,712

RECORD MEMBER

Thomas H. Mead, Los Angeles, Calif., assignor to Radio Corporation of America, a corporation of Delaware Filed Apr. 1, 1957, Ser. No. 649,916
1 Claim. (Cl. 235—61.12)

This invention relates to data processing equipment, and more particularly to a record member for the recordation of data.

In information handling systems, several media are used for data input, data storage, and data output. Well known among these are perforated cards and magnetizable tape.

In many applications, it is desirable to retrieve individual messages from a large volume message store. A perforated Hollerith card may be used for this purpose, but is limited in its storage capacity. Further, individual cards must be perforated and, once perforated, are not easily altered. A new card must be prepared to add or change stored information.

The Hollerith card has been modified to record information in other forms. Modifications have included printing of marks with electrically conductive inks, which may be capacitatively read, or magnetizable inks. A card with a magnetizable surface has also been suggested, but problems of transport, reading, and writing, have limited its acceptance.

Tape on reels, although economical as a large capacity memory, is often not convenient for storage of individual messages especially if large areas of tape must be scanned to find a particular message. Further, after a particular one of a plurality of tapes is addressed to narrow the search, electronic circuitry is still necessary for item-by-item searching of the tape to find the desired information.

It is an object of the present invention to provide an improved, discrete, magnetizable record member for use in magnetic recording of information.

It is a further object to provide an improved record member having greater structural strength than record members of the prior art and in which the magnetizable medium is replaceable.

It is a still further object of invention to provide a magnetizable record member especially well adapted to automatic handling, which may be a unit of a large scale information store and which can be easily retrieved with addressable automatic mechanisms.

It is a still further object of invention to provide an improved magnetizable record member which may be easily handled mechanically and easily read by magnetic heads and pressure pads.

According to the present invention, an improved storage record member combines features of both the record card and magnetic tape. A frame is provided with an opening in which a strip of magnetizable tape is mounted. The tape is drawn tight but not taut and the ends are fastened to the frame. The frame may be a structurally rigid plastic or metal which may be readily handled in automatic equipment.

A magnetic head and pressure pad combination may read or record information on the tape. There is sufficient play in the tape to permit precise registration of the tape relative to the head. The frame is moved to transport the tape between the head and the pressure pad for reading, writing or erasing. Use of the pressure pad and recording head to direct and control the flexible tape improves the quality of the read, write, or erase signals.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figures 1, 2:
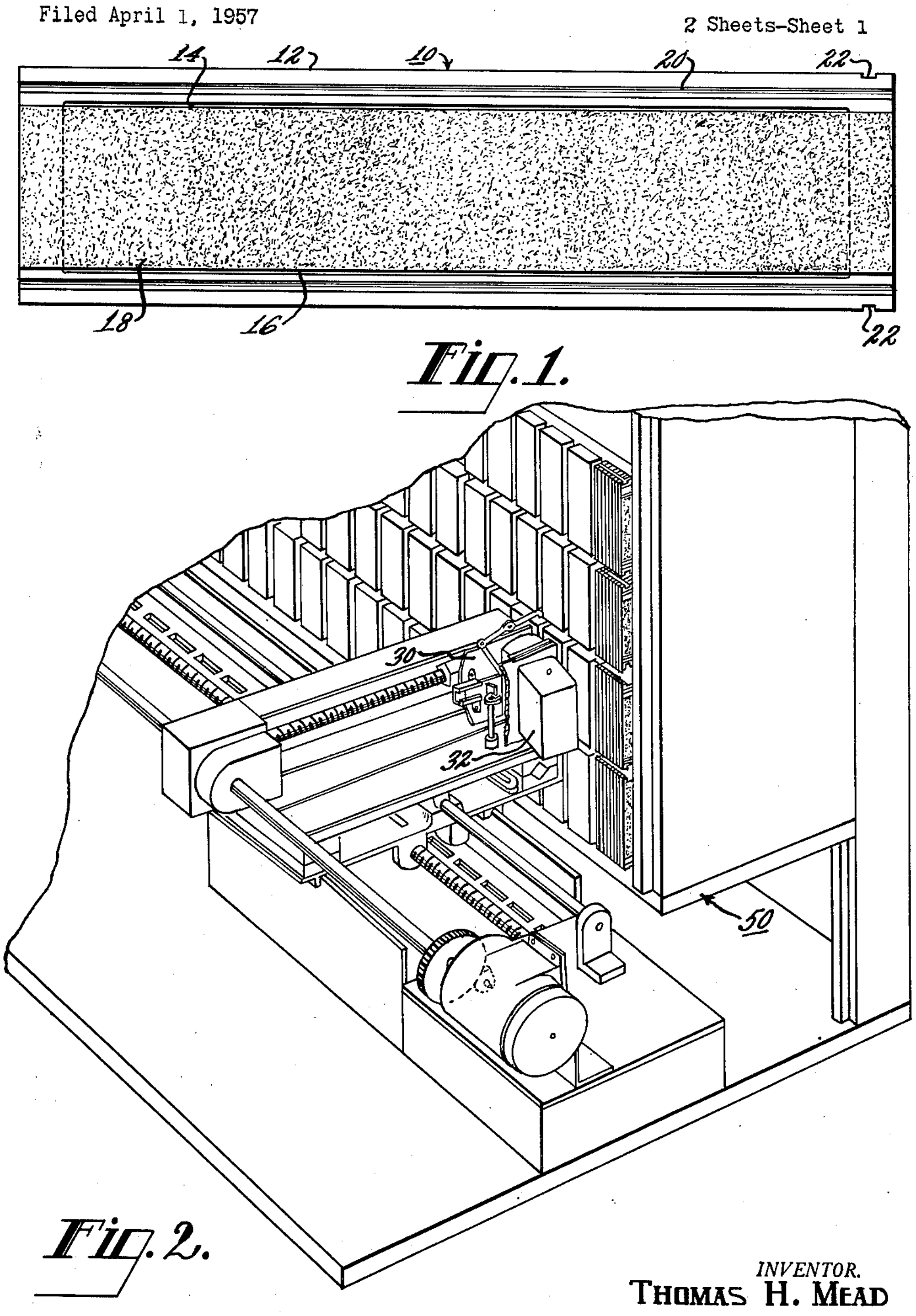
FIGURE 1 is a plan view of a record member according to the present invention.
FIGURE 2 is a perspective view of a portion of a reading and recording apparatus in which the record member of FIGURE 1 may be employed.

The rectangular record member 10 of FIGURE 1 is a preferred embodiment of the present invention. The record member or card 10 has a frame 12 with a rectangular cutout portion or aperture 14. A strip of magnetizable tape 16, cut to the approximate length of the card 10, has a width slightly less than the width of the aperture 14. The strip 16 is centered in the aperture 14 and secured to the frame 12 at opposite ends by an adhesive.

An alternative mounting method may include piercing the frame 12 to form a slit with or without a tab. A mating tab or slit in the tape 16 may engage the slit or tab or both to hold the tape 16 on the frame 12. The tape may then be crimped or cemented into place. For permanent adherence, both crimping and adhesive may be applied to both the frame 12 and the tape 16.

The tape 16 is mounted with the magnetizable surface 18 facing away from the frame 12. The tape 16 is drawn straight but not taut and a slight amount of play is permitted.

A pair of parallel stiffening ridges 20 may be formed along the upper and lower lengths of the frame 12 to enhance structural rigidity. The ridges may also serve to orient the cards 10 with respect to a mounting frame so that the cards 10 all face in the same direction (see FIG. 4). To facilitate mechanical handling, notches 22 may be cut in the upper and lower edges of the frame 12 at one of the ends. The notches 22 may be grasped by suitable handling mechanisms.

Figure 3:
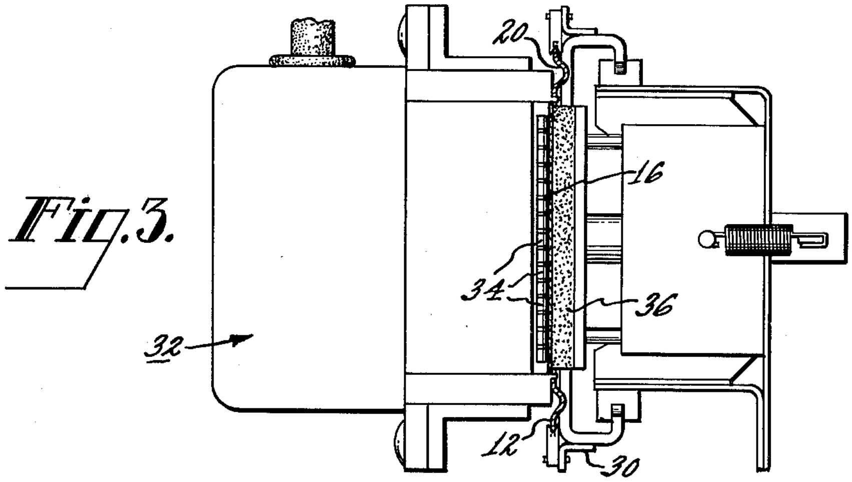
FIGURE 3 is a side view of a head assembly of the apparatus of FIGURE 2.

A read-write head assembly suitable for reading or writing information on the card 10 is illustrated in FIGURES 2 and 3. A transport mechanism 30 engages the notches 22 and moves the card in a straight line, parallel to the plane of, and the long dimension of, the card 10. A magnetic head assembly 32 may have a plurality of read-write heads 34 laminated together for the recording of a plurality of parallel channels on the tape portion 16. A pressure pad 36 is provided opposite read-write heads 34 to engage the tape portion 16 between the head assembly 32 and the pressure pad 36. The head assembly 32 and pressure pad 36 are each narrower than the width of the frame aperture 14 and, therefore, are out of contact with the frame 12.

As the tape portion 16 is transported between the head assembly 32 and the pressure pad 36, information may be read or erased from the tape 16 by the heads 34, or new information may be written on the tape 16, by the same heads 34.

Figure 4:
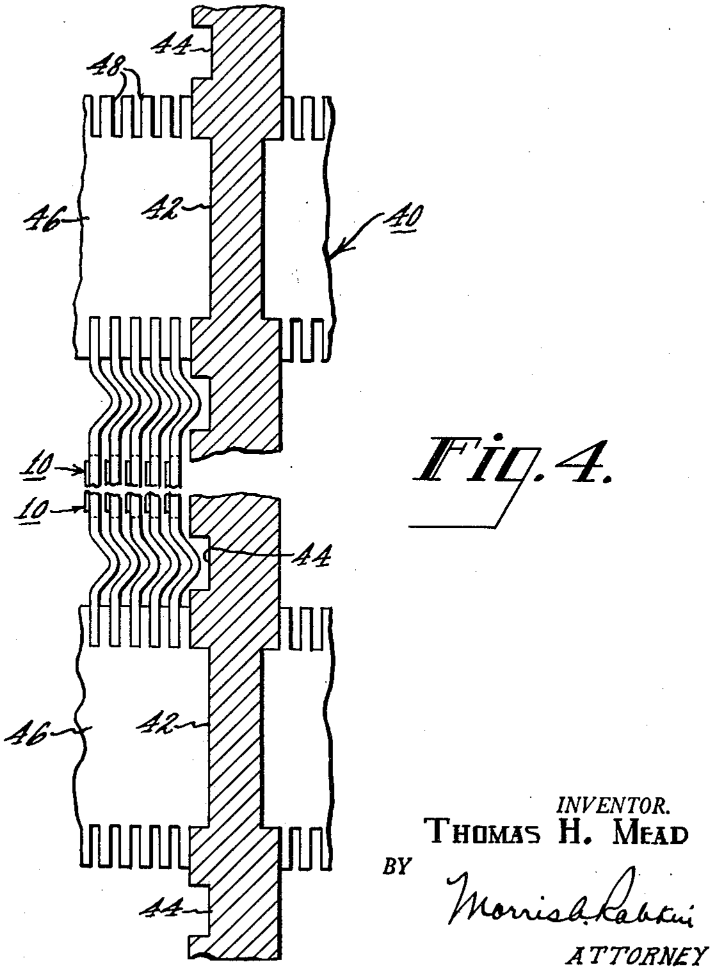
FIGURE 4 is an end view of a plurality of record members in a suitable storage frame.

FIGURE 4 is a transverse cross-sectional view of a portion of a support structure 40 suitable for storage of a plurality of record cards 10. A plurality of side wall members 42 each has two apertures 44 along one face. The apertures 44 receive the stiffening ridges 20 of an individual card 10.

Upper and lower horizontal supports 46 are fitted in the side wall members 42 to provide a rectangular storage area or cell for a group of cards 10. Each horizontal support member 46 has a set of evenly spaced card notches 48 cut in the upper and lower surfaces. The width of each card notch 48 is sufficient to accommodate an individual frame 12. The spacing between adjacent notches 48 is such to provide a reasonable separation between adjacent cards 10.

Each cell enclosed by side wall members 42 and horizontal support members 46 may be considered an elemental unit of a large scale card store 50. It is apparent that the side walls 42 may be extended vertically to provide tiers or banks of storage areas and that additional horizontal support members 46 and side walls 42 may be added to extend the card store 50 horizontally.

The combination of the apertures 44 of the side wall members 42, the card notch 48 spacing, and the stiffening ridges 20 of the individual cards 10, provides a ready means of orientation to help prevent a card 10 from being stored in a reversed position.

Known magnetic recording techniques write as many as 500 individual magnetic signals in one longitudinal channel of the tape 16. In a preferred embodiment, a plurality of parallel channels are used to record information in parallel by bit, but serial by character. As many as 512 characters are written on the strip of tape 14 using seven parallel channels. If desired, fourteen channels can be used and two 512-character messages stored in adjacent bands on each record member. Alternatively, several tapes 16 may be mounted, side-by-side, within the frame aperture 14.

A large scale random access storage file using the record members of the present invention may be constructed. Each record member is placed in one of the physical address locations in the storage frame 40 shown in FIGURES 2 and 4. Each card location may be assigned a different two-coordinate address. Every stored message may have an address location corresponding to its physical placement included within the first group of characters.

Suitable selector mechanisms, controlled by the address signals of the message, direct mechanical retrieval means to a particular physical address location and an individual card stored there can be withdrawn from the card support structure 40. The magnetic head assembly 32 may then read the message stored on the card 10, or, may write a new message. The card 10 is then returned to the support structure 40 and the retrieval mechanism directed to a new location. The record member of the present invention may be used in other information handling and date processing systems. The system here illustrated is shown by way of example.

Thus, there has been disclosed a novel information storage element. The record member has the information storage density, information transfer rate, and erasability of magnetic tape and yet possesses the individuality of the perforated record card. The structurally rigid frame permits rough mechanical handling of the card without damage to the information storage area. The tape, if damaged or worn, may be easily replaced in the frame at small expense.

What is claimed is:

In combination, a holder formed with two like sets of parallel slots; a plurality of rectangular frames held at opposite edges in the slots in the holder, each frame being formed with two ridges spaced from and parallel to the opposite edges of the frame held by the slots, said ridges each extending from the same surface of each holder a distance sufficient so that the holders can be slid into the slots in the frame only if the frames all face in the same direction, said ridges serving also to strengthen the frames; and a sheet of recording material secured to each frame over the opening in each frame.

References Cited in the file of this patent

UNITED STATES PATENTS

| | | |
|---|---|---|
| 1,682,828 | Brand | Sept. 4, 1928 |
| 2,144,844 | Hickman | Jan. 24, 1939 |
| 2,363,096 | Sullivan | Nov. 21, 1944 |
| 2,620,389 | Potter | Dec. 2, 1952 |
| 2,650,830 | Potter | Sept. 1, 1953 |
| 2,674,728 | Potter | Apr. 6, 1954 |
| 2,722,676 | Begun | Nov. 1, 1955 |
| 2,902,329 | Brink et al. | Sept. 1, 1959 |

FOREIGN PATENTS

| | | |
|---|---|---|
| 796,386 | Great Britain | Mar. 6, 1957 |

OTHER REFERENCES

"500,000-Bit Random Access Memory" (Comstock), Instruments and Automation, vol. 29, pp. 2208–2211, November 1956.